United States Patent [19]

Fraenkel et al.

[11] Patent Number: 6,151,622
[45] Date of Patent: Nov. 21, 2000

[54] METHOD AND SYSTEM FOR PORTABLY ENABLING VIEW SYNCHRONIZATION OVER THE WORLD-WIDE WEB USING FRAME HIERARCHIES

[75] Inventors: Michael L. Fraenkel; Sandeep Kishan Singhal, both of Raleigh, N.C.

[73] Assignee: International Business Machines Corp., Armonk, N.Y.

[21] Appl. No.: 09/017,542

[22] Filed: Feb. 2, 1998

[51] Int. Cl.[7] .................................................. G06F 15/16
[52] U.S. Cl. ........................... 709/205; 709/204; 709/248
[58] Field of Search .................................. 709/205, 204, 709/213, 228, 248; 370/260; 345/329, 330, 331, 332, 2, 15

[56] References Cited

U.S. PATENT DOCUMENTS

| | | | |
|---|---|---|---|
| 5,446,842 | 8/1995 | Schaeffer et al. | 709/205 |
| 5,535,304 | 7/1996 | Sanjoh et al. | 706/53 |
| 5,805,869 | 9/1998 | Smith et al. | 345/507 |
| 5,861,883 | 1/1999 | Cuomo et al. | 345/326 |
| 5,862,330 | 1/1999 | Anupam et al. | 709/204 |
| 5,886,694 | 3/1999 | Breinberg et al. | 345/340 |
| 5,926,179 | 7/1999 | Matsuda et al. | 345/355 |
| 5,930,801 | 7/1999 | Falkenhainer et al. | 707/103 |
| 5,937,163 | 8/1999 | Lee et al. | 345/356 |
| 5,941,945 | 8/1999 | Aditham et al. | 709/205 |
| 5,944,791 | 8/1999 | Scherpbier | 709/218 |
| 5,951,652 | 9/1999 | Ingrassia, Jr. et al. | 709/248 |

*Primary Examiner*—Zarni Maung
*Assistant Examiner*—Jason D. Cardone
*Attorney, Agent, or Firm*—A. Bruce Clay; Myers, Bigel, Sibley & Sajovec, P.A.

[57] ABSTRACT

Methods, systems and computer program products are provided for synchronizing views among a plurality of different Web browsers in a network environment by selecting a source root frame displayed by a source browser included in the plurality of different web browsers and generating a description of a frame hierarchy from the selected source root frame. The description of a frame hierarchy is transmitted over the network environment and the frame hierarchy duplicated from the description into a selected target root frame of at least one of the plurality of different Web browsers.

30 Claims, 6 Drawing Sheets http://foo.bar.com/A.html
```
<HTML>
<FRAMESET ROWS="50%,*">          310
    <FRAME NAME="A" SRC="http://www.ibm.com/index.html">        301
    <FRAME NAME="B" SRC="http://foo.bar.com/B.html"> — 304
</FRAMESET>
</HTML>
```

FIG. 3A
Prior Art http://foo.bar.com/B.html
```
<HTML>
<FRAMESET COLS="50%,*">          311
    <FRAME NAME="C" SRC="http://www.microsoft.com/index.html">        302
    <FRAME NAME="D" SRC="http://www.sun.com/index.html"> — 303
</FRAMESET>
</HTML>
```

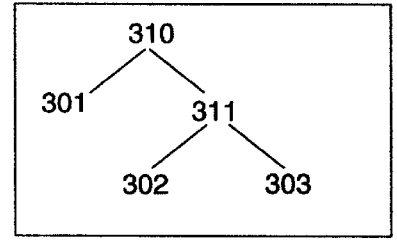

FIG. 3B
Prior Art

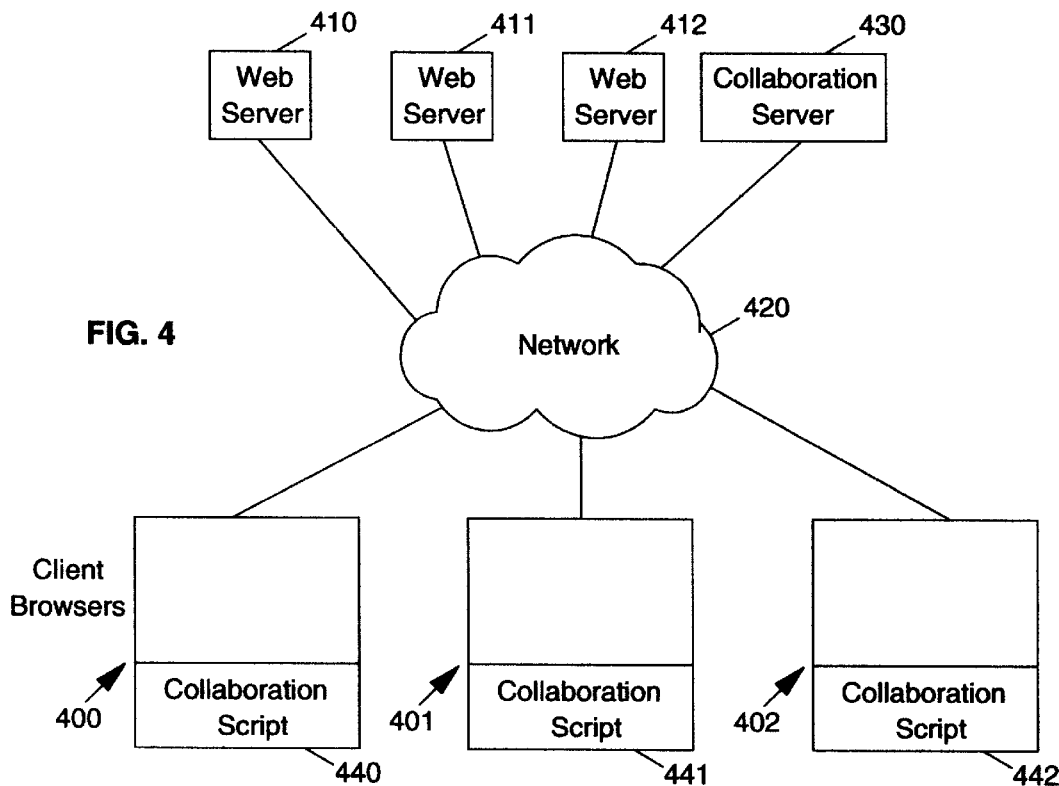

FIG. 4

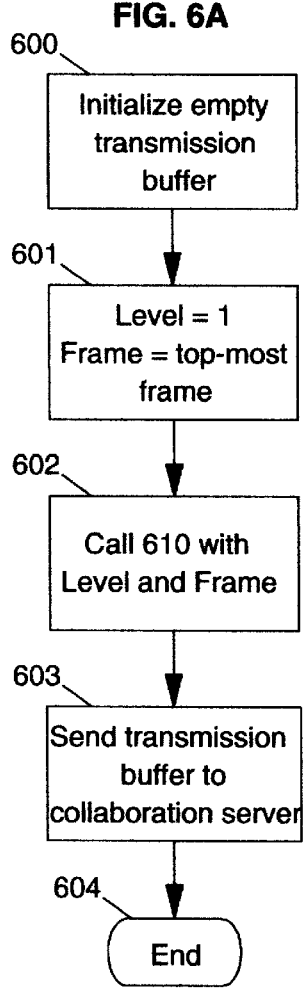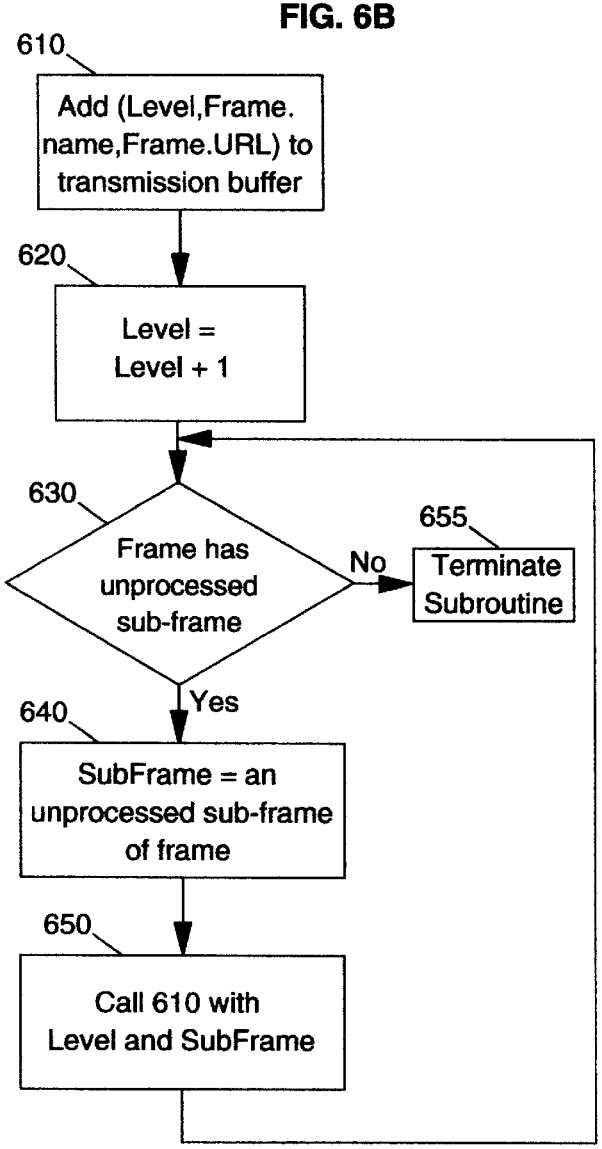
FIG. 6A
FIG. 6B

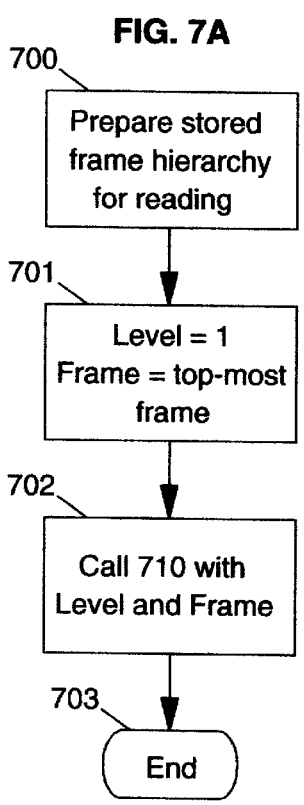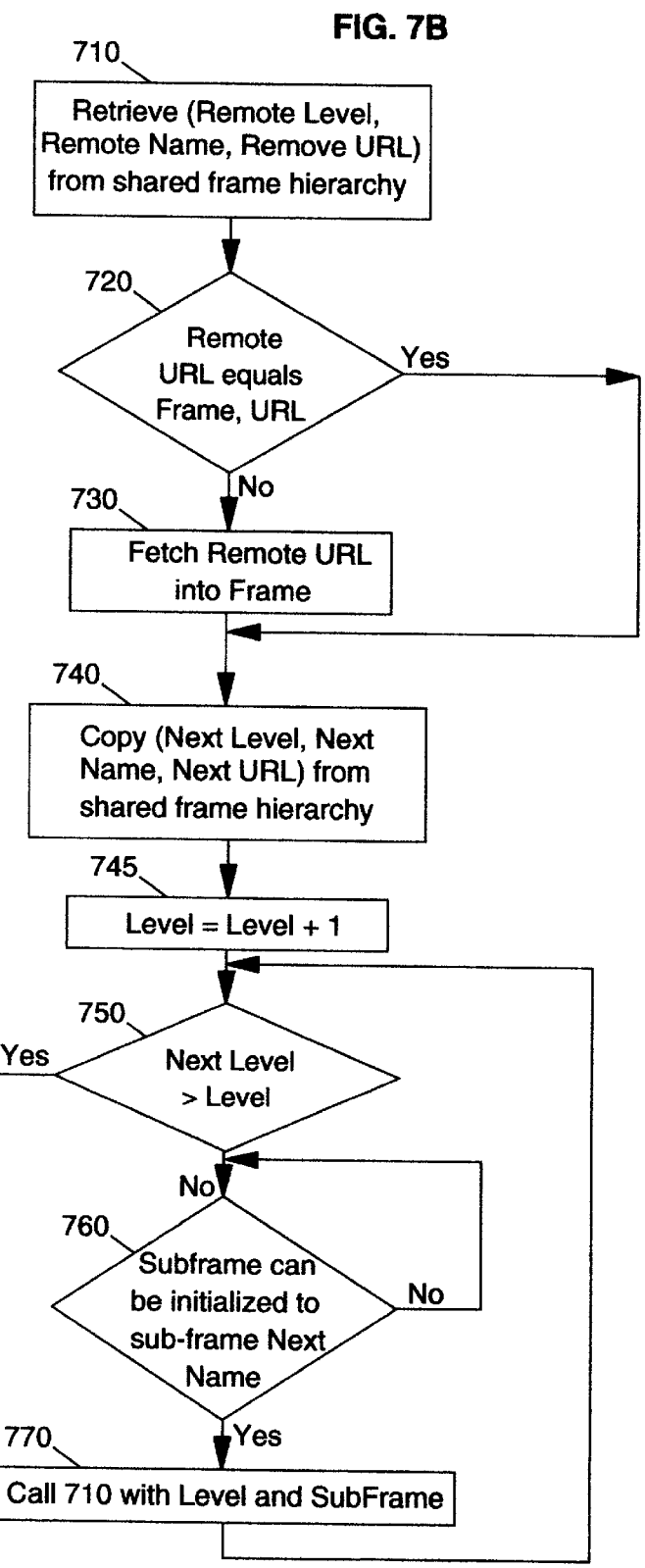
FIG. 7A
FIG. 7B

METHOD AND SYSTEM FOR PORTABLY ENABLING VIEW SYNCHRONIZATION OVER THE WORLD-WIDE WEB USING FRAME HIERARCHIES

FIELD OF THE INVENTION

This invention relates in general to computer software, and in particular to a method and system for enabling multi-user collaboration over the World-Wide Web. More particularly, the present invention relates to a method and system by which one user may reflect a browser display onto a browser of other users.

BACKGROUND OF THE INVENTION

In many applications over the World-Wide Web, it is desirable for multiple users to maintain a common browser view. In other words, all users should see the same set of Web pages displayed in their respective Web browsers. Systems requiring this functionality include distance learning, remote presentations, on-line help desks, and collaborative research. There are three types of collaborative environments in use today over the World-Wide Web.

The first type delivers a collaboration application that contains a Web browser. The browser is treated as a component of the collaboration application; the application intercepts user interface events to and from the browser and can communicate all of these changes to other users who are running the same application. This approach has the distinct disadvantage of requiring users to install a separate application to support collaboration. Users, therefore, cannot collaborate unless they have all installed the same application. This is a significant restriction for many uses of collaboration and defeats the platform-independence goals of the World-Wide Web.

The second type of collaborative environment attempts to support the collaboration by directing all Web browser retrievals through a proxy or other server. The proxy records the pages being fetched and disseminates that information so that other browsers can retrieve the same Web pages. However, this approach is limited. The browser window may be split into multiple frames, each displaying a different Web page. Aside from knowing which pages have been retrieved, a server knows neither which pages are actually being displayed by the browser widow at any one time nor how those pages are actually laid out on the window.

This inability to support browser frames is a significant issue in collaborative browsing applications such as distance learning. First, the user can only visit and share a selected subset of Web sites. This method, therefore, limits the effectiveness of an education experience by limiting the scope of content that may be included within the presentation. Second, such systems are error-prone. Once the controlling user has accidentally visited a page that contains frames, the system can never re-synchronize the users' views. Additionally, the controlling user receives no indication that erroneous displays are being presented. Third, presentation graphics software often generates HTML content that assumes and depends upon support for frames (e.g. a frame for the slide and a frame for the caption notes). Without support for frames, a distance learning application cannot use content generated by such applications.

The third type of collaborative environment attempts to actually share the Web browser window as a graphical image. These systems disseminate the content of each pixel on the browser display. However, this approach eliminates the autonomy of the receiving user (whose display is only a graphical image); the user would need to run a separate browser to visit Web sites independently. Finally, this approach consumes considerable network bandwidth.

Therefore, a need exists for a portable way for enabling the sharing of Web browser displays among multiple users. This technique should run with existing Web browsers and not require the installation of additional software. It should support replication of the visual frame layout within the browser window. Moreover, it should allow each user to retain a level of autonomy over his/her own browser.

SUMMARY OF THE INVENTION

An object of the present invention is to provide a method for capturing information about a source Web browser display, conveying that information to other users, and replicating the source browser display at each recipient host.

Another object of the present invention is to enable the Web browser display to be reflected only on demand by the source browser user.

Yet another object of the present invention is to enable sharing within the context of existing browsers without the need to install additional software.

To achieve the foregoing objects and in accordance with the purpose of the invention as broadly described herein, a method and system are disclosed for using embedded scripts to capture the browser's visual frame hierarchy, disseminate that hierarchy, and replicate that hierarchy at remote Web browsers. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 3A illustrates framesets used to define frames in a Web browser in accordance with the prior art;

FIG. 3B illustrates frameset tags in a hierarchy in accordance with the prior art;

FIG. 4 illustrates data processing elements of a collaborative system that supports the sharing of Web browser views in a platform-independent manner;

FIGS. 6A and 6B are flowcharts showing how the collaboration script captures a current browser's displayed frame hierarchy; and FIGS. 7A and 7B are flowcharts showing how the collaboration script replicates the shared displayed frame hierarchy onto a local browser.

DETAILED DESCRIPTION OF THE INVENTION

Figure 1:
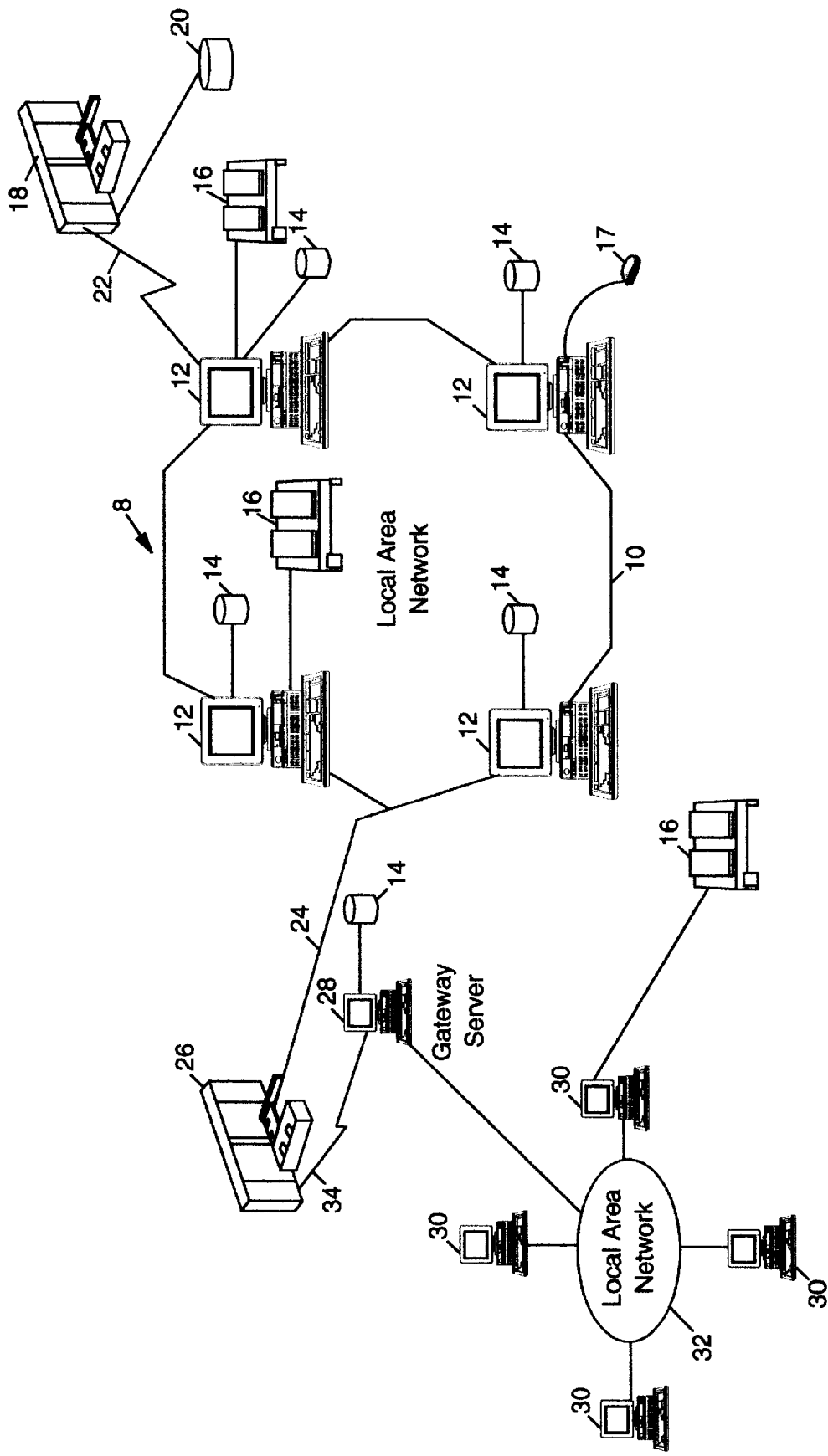
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
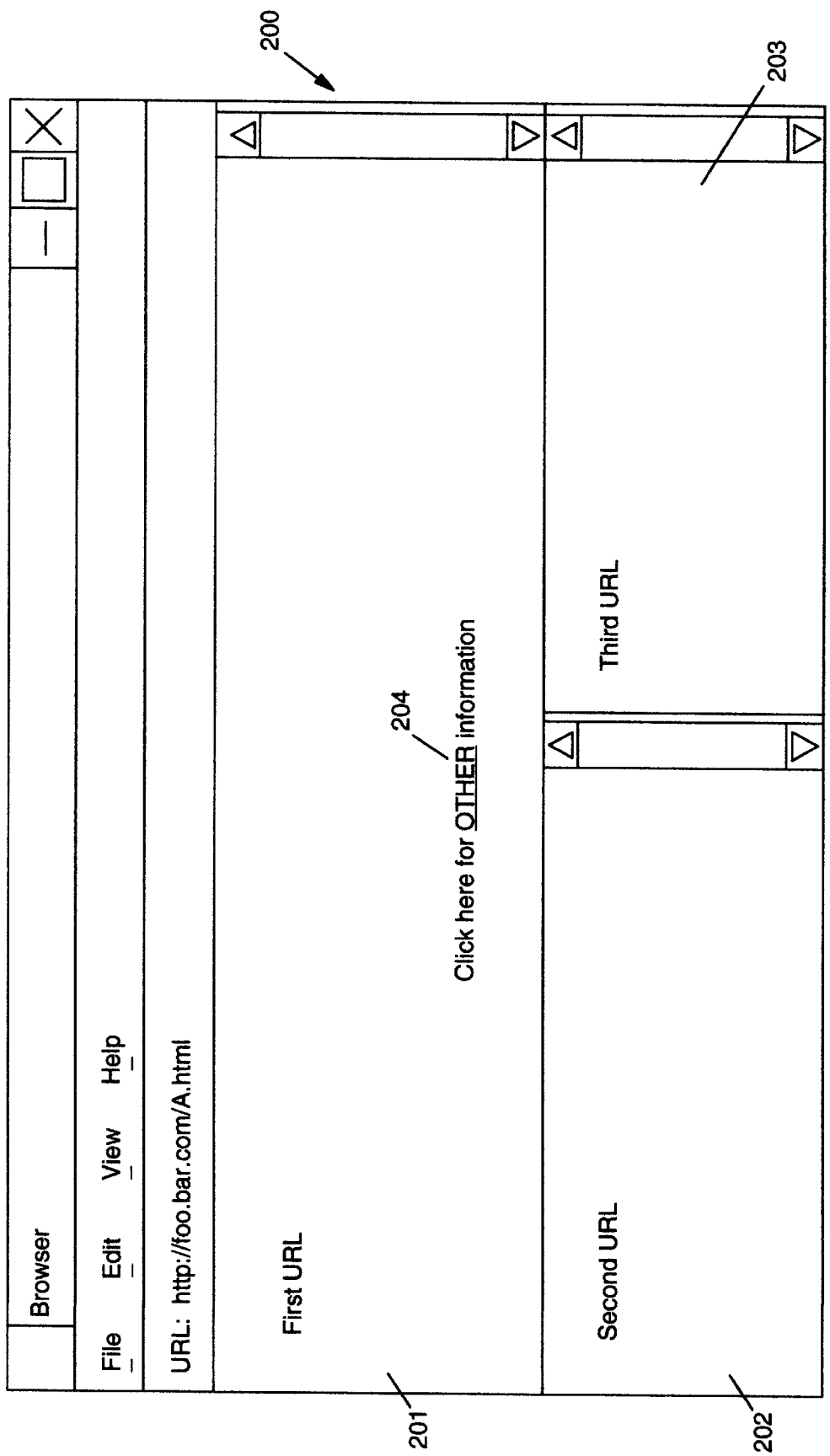
FIG. 2 shows a Web browser displaying multiple Web pages in frames in accordance with the prior art.

Referring now to FIG. 2, the contents of a typical Web browser display are shown. A browser window 200 is sub-divided into frame 201, frame 202, and frame 203, each associated with a different URL (Universal Resource Locator). For example only, frame 201 may contain a First URL page, "http://www.ibm.com/index.html;" frame 202 may contain a Second URL page, "http://www.microsoft.com/index.html;" and frame 203 may contain a Third URL page, "http://www.sun.com/index.html." The user sees all three Web pages simultaneously. By clicking on a hyperlink in one of the frames, the user only affects the content of the respective frame. For example, by clicking on the "Other" link 204 on the First URL page (frame 201), the user changes frame 201 to contain another URL page without affecting the contents of frames 202 or 203.

Referring to FIG. 3A, the various pieces of HTML (Hyper-Text Markup Language) that generate the browser display shown in FIG. 2 are illustrated, in accordance with the prior art. The window refers to a top-level URL "http://foo.bar.com/A.html" whose page contains a "FRAMESET" tag 310. Tag 310 describes how the window 200 should be split horizontally into a first frame 301 (corresponding to First URL 201 in FIG. 2) and a second frame 304 (corresponding to the combination of Second URL 202 and Third URL 203 in FIG. 2). The FRAMESET tag 310 also signals that the first frame 301 (First URL 201 in FIG. 2) should reference, for example, the URL "http://www.ibm.com/index.html" and that the second frame 304 should reference, for example, the URL "http://foo.bar.com/B.html."

Continuing with FIG. 3A, the page "http://foo.bar.com/B.html" also contains a FRAMESET tag 311 that requires its containing frame to be split vertically into a first sub-frame 302 and a second sub-frame 303 (corresponding to Second URL 202 and Third URL 203 in FIG. 2). The FRAMESET tag 311 also signals that the first sub-frame 302 should reference, for example, the URL "http://www.microsoft.com/index.html," and that the second sub-frame 303 should reference, for example, the URL "http://www.sun.com/index.html." Thus, the various FRAMESET tags form a hierarchy of frames, as shown in FIG. 3B. Although FIGS. 2 and 3 describe particular visual displays, it is to be understood that arbitrary frame layouts are possible, and that the window need not be split into frames at all.

Referring now to FIG. 4, the basic elements of a browser sharing system in accordance with the present invention are illustrated. The system includes multiple Web browsers generally indicated by reference numerals 400, 401, and 402, each capable of executing a scripting language such as, for example, JAVASCRIPT™, VBSCRIPT™, or JAVA™. Such scripting languages are commonplace in the prior art and are, therefore, not claimed as part of the present invention. The browsers 400, 401 and 402 interact with Web servers 410, 411, and 412 through a network 420. From the Web servers 410, 411, and 412, the browsers 400, 401, and 402 retrieve Web documents. The browsers 400, 401, and 402 also interact with a collaboration server 430. The collaboration server 430 exchanges information about the Web display among the browsers 400, 401, and 402. Each browser 400, 401, or 402 is divided into at least two frames. Within at least a first frame (the collaboration frame) 440, 441, and 442, respectively, of each browser 400, 401, and 402, a collaboration script executes and exchanges information with the collaboration server 430. The collaboration server 430 may either "push" information to these scripts directly, or the scripts may periodically request information ("pull") from the server 430. Though not pictured, this "pull" may be implemented as a periodic HTML retrieval into a separate off-screen browser frame. It is to be understood that the first frames 440, 441, and 442 may be of zero size and, therefore, not be visible to the user. Alternatively, a visible user interface may be presented thereby.

Figure 5:
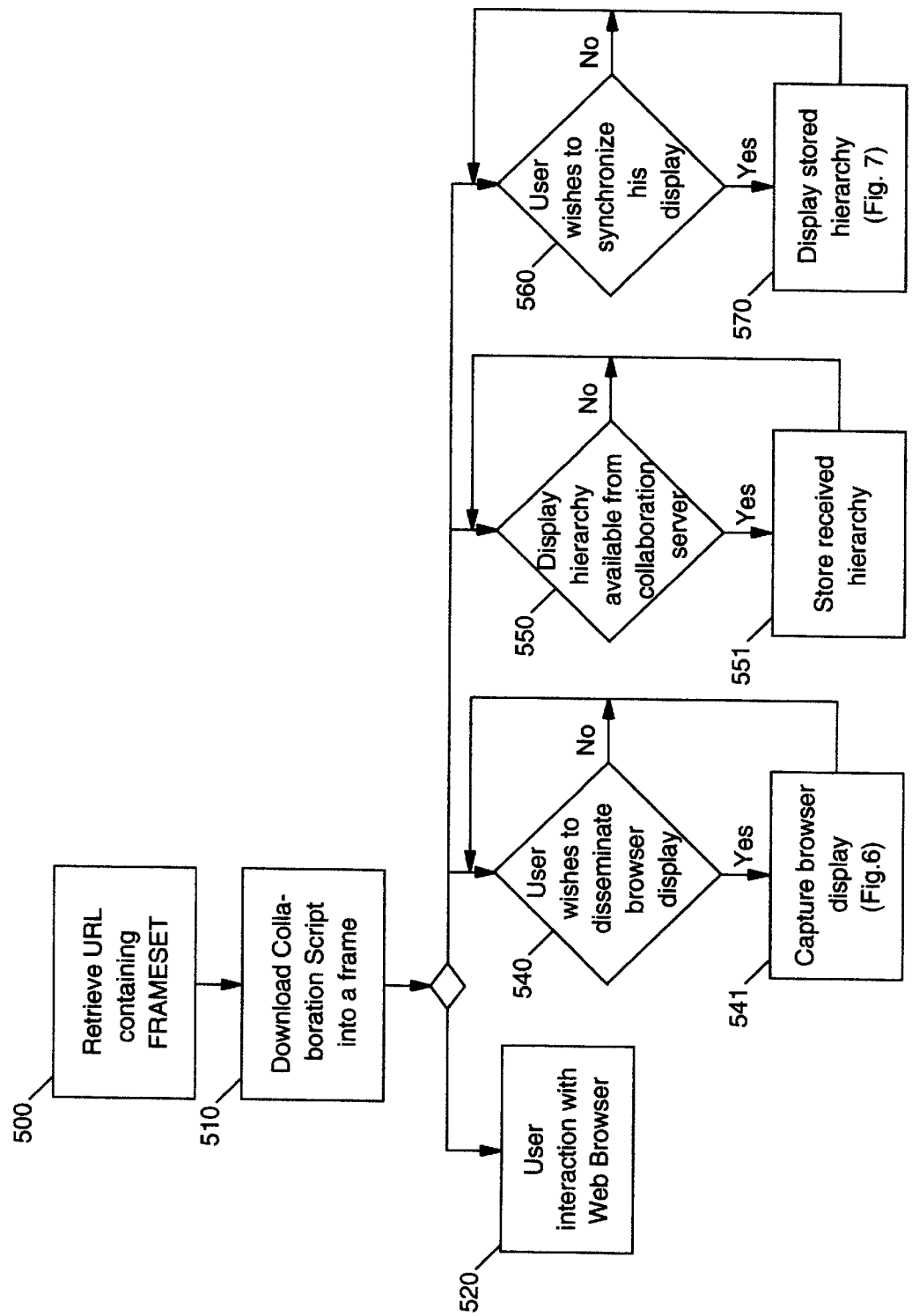
FIG. 5 illustrates a high level flowchart depicting the execution of collaboration script within a Web browser.

Referring now to FIG. 5, a flowchart depicts execution of the collaboration script within a Web browser. At block 500, a top-level URL containing a FRAMESET tag is retrieved. At block 510, the collaboration script is downloaded into one of the frames created by the aforementioned FRAMESET tag. The procedure then splits into four parallel execution paths commencing at blocks 520, 540, 550, and 560, respectively. At block 520, the user interacts with the Web browser (in the other frames created by the aforementioned FRAMESET) by clicking on URL hyperlinks or menu items.

Continuing with FIG. 5, the second process is responsible for publishing the local user's browser display to other users via the collaboration server 430 (see FIG. 4). At decision block 540, it is determined whether or not the user wishes to disseminate his browser display to other users. This decision may be made either by explicit action by the user (e.g. clicking on a button) or by some automated means (such as a periodic timeout). If the answer to decision block 540 is no, then control returns to decision block 540. If the answer to decision block 540 is yes, then at block 541, the current browser display hierarchy is captured in accordance with a procedure which will be subsequently described with reference to the steps of FIG. 6. Control then returns to decision block 540.

The third process is responsible for receiving published browser displays from other users via the collaboration server 430 (FIG. 4). At decision block 550, it is determined whether or not a new browser frame hierarchy is available from the collaboration server (either because such information was pushed to the client from the server or because a periodic process retrieved new information). If the answer to decision block 550 is no, then control returns to decision block 550. If the answer to decision block 550 is yes, then at block 551, that frame hierarchy is stored by the collaboration script and control returns to decision block 550.

The fourth process in FIG. 5 renders a published browser display on a local user's browser. At decision block 560, it is determined whether or not the user wishes to synchronize his browser display with that of the other users (either by explicit action by the user such as clicking on a button or by some automated means such as a periodic timeout). If the answer to decision block 560 is no, then control returns to decision block 560. If the answer to decision block 560 is yes, then at block 570, the current browser display hierarchy (stored by the collaboration script in block 551) is displayed in accordance with a procedure which will be subsequently described with reference to the steps of FIG. 7. Control then returns to decision block 560.

Referring now to FIGS. 6A and 6B, flowcharts show how the collaboration script captures the current browser frame hierarchy for transmission to the collaboration server. At block 600, a transmission buffer is initialized empty. At block 601, a variable Level is initialized to 1 and a variable Frame is initialized to reference the root of the frame hierarchy which is to be published. At block 602, a subroutine 610 (FIG. 6B) is invoked, passing the variables Level and Frame as parameters. At block 603, the transmission buffer is transmitted to the collaboration server, and the process terminates at 604.

The collaboration script traverses the frame hierarchy from its root (top-most of the frameset) to its leaves (deepest frame). For each frame, it outputs the depth of that frame in the hierarchy, the name of the frame, and the URL representing the frame's contents. Each invocation of the subroutine 610 generates output for one sub-branch of the frame hierarchy.

Continuing with FIG. 6B, the subroutine 610 adds a frame entry to the transmission buffer comprising the value of the variable Level, the name of the frame associated with the Frame variable, and the URL associated with the Frame variable. At block 620, the local variable Level is incremented by 1 which reflects progression to the next level of the frame hierarchy. At decision block 630, it is determined whether or not the local variable Frame has any unprocessed sub-frames. If the answer to decision block 630 is yes, then at block 640, a variable SubFrame is initialized to one of the unprocessed sub-frames of Frame. At block 650, the subroutine 610 is invoked recursively, passing the current values of Level and SubFrame as parameters. This recursive call causes processing of the frame hierarchy represented by the SubFrame variable. Once the call returns, control then returns to decision block 630. If the answer to decision block 630 is no, then subroutine 610 terminates at block 655 and control returns to the subroutine caller (block 602 or block 650).

Referring now to FIGS. 7A and 7B, flowcharts show how the collaboration script reflects the shared frame hierarchy onto the local browser's display. At block 700, the shared frame hierarchy is prepared for reading. At block 701, a variable Level is initialized to 1 and a variable Frame is initialized to reference the browser frame that is to contain the shared frame hierarchy. At block 702, a subroutine 710 (FIG. 7B) is invoked, passing the variables Level and Frame as parameters. At block 703, the process terminates.

The collaboration script traverses the frame hierarchy that is currently rendered in the user's local browser. It compares each rendered frame name and URL against the corresponding frame in the shared frame hierarchy. Where the frames do not match, the script initiates loading of the appropriate URL from the shared hierarchy. Each invocation of the subroutine 710 matches one sub-branch of the frame hierarchy.

Continuing with FIG. 7B, the subroutine 710 retrieves the first frame entry from the shared frame hierarchy and stores its components into the local variables RemoteLevel, RemoteName, and RemoteURL corresponding to the level, name, and URL for the corresponding frame at the source browser display (as stored in block 610 of FIG. 6). At decision block 720, it is determined whether or not RemoteURL equals the URL associated with the local Frame variable. If the answer to decision block 720 is no, then at block 730, the local browser is instructed to fetch RemoteURL into the Frame. This request may be handled either synchronously or asynchronously. After block 730, or if the answer to decision block 720 is yes, control continues at block 740 in which the next frame entry of the shared hierarchy is copied into local variables NextLevel, NextName, and NextURL. This procedure is simply a "look-ahead" and does not actually forward the read pointer past the next entry in the shared hierarchy. At block 745, the local variable Level is incremented by 1, so the script may now inspect the next level in the frame hierarchy. At decision block 750, it is determined whether or not NextLevel is less than the local variable Level. If the answer to decision block 750 is no, then at decision block 760, it is determined whether or not a variable SubFrame can be initialized to reference a sub-frame of Frame in the local browser with the name NextName. This SubFrame represents the browser target for the frame hierarchy rooted at NextFrame. If the answer to decision block 760 is no, then it is determined that the current Frame has not completed loading, and control returns to decision block 760. If the answer to decision block 760 is yes, then at block 770, subroutine 710 is invoked recursively. Parameters to this subroutine are Level and the variable SubFrame. The subroutine handles the loading of the frame hierarchy rooted at NextFrame into the SubFrame browser frame. Then the subroutine returns control to decision block 750. If the answer to decision block 750 is no, then subroutine 710 terminates at block 780 and control returns to the subroutine caller (block 702 or block 770).

Although entries in the shared frame hierarchy have been described with respect to a particular data format, it is to be understood that alternative implementations of this invention may employ other data representations. These alternative representations may include the actual content of the displayed Web pages, or they may contain scripts that perform the tasks of FIG. 7.

In this way, the collaboration system can exchange information from one browser display and represent a replicated view at other browser displays. Moreover, because control of the browser is performed through a standard scripting language, the collaboration system is independent of the particular machine or operating system environment and is independent of the particular Web Browser in use.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of synchronizing views among a plurality of different Web browsers in a network environment, comprising the steps of:
   selecting a source root display frame displayed by a source browser included in said plurality of different web browsers;
   generating a description of browser display frames associated with the source root display frame as a frame hierarchy of browser display frames from said selected source root frame;
   transmitting said description of a frame hierarchy over the network environment; and
   duplicating said frame hierarchy from said description into a selected target root display frame of at least one of said plurality of different Web browsers to thereby provide the browser display frames in the frame hierarchy to the at least one of said plurality of different Web browsers so as to synchronize the view of the source browser and the at least one of said plurality of different Web browsers.

2. The method of claim 1, wherein said step of generating a description comprises the steps of:
   capturing an entry about said source root frame; and
   capturing an entry about each subframe in said frame hierarchy.

3. The method of claim 2, wherein said entry about said source root frame comprises a URL contained in said source root frame and wherein said entry about each subframe comprises:
   a name of each subframe;
   a URL contained in said each subframe; and
   a depth of said each subframe in said frame hierarchy.

4. The method of claim 1, wherein said step of duplicating said frame hierarchy using said description comprises the steps of:
   determining whether a URL currently loaded in said target root frame is identical to a URL loaded into said source root frame; and
   initiating a load of said URL of said source root frame into said target root frame if said determination is false.

5. The method of claim 4, further comprising the steps of:
   retrieving from said description a plurality of entries, each of said plurality of entries providing information about an associated subframe in said frame hierarchy;
   determining for each of said entries whether said associated subframe has a corresponding subframe of said target root frame;
   determining whether said URL for said associated subframe is loaded into said corresponding subframe; and
   initiating a load of said URL into said corresponding subframe if said URL is not loaded into said corresponding subframe.

6. The method of claim 1, wherein said step of generating a description is performed by a Collaboration Script executing within a Collaboration Frame in the browser display, and wherein said step of duplicating said frame hierarchy is performed by said Collaboration Script executing within a Collaboration Frame in the browser display.

7. The method of claim 6, wherein said Collaboration Frame is not visible to the user.

8. The method of claim 1, wherein said step of transmitting comprises the steps of:
   transmitting said description from said source browser to a collaboration server; and transferring said description from said collaboration server to at least one of said plurality of different web browsers.

9. The method of claim 1, wherein said step of generating a description is initiated by user action.

10. The method of claim 1, wherein said step of using said description is initiated by user action.

11. A system for synchronizing views among a plurality of different Web browsers in a network environment, comprising the steps of:
    means for selecting a source root display frame displayed by a source browser included in said plurality of different web browsers;
    means for generating a description of browser display frames associated with the source root display frame as a frame hierarchy of browser display frames from said selected source root frame;
    means for transmitting said description of a frame hierarchy over the network environment; and
    means for duplicating said frame hierarchy from said description into a selected target root display frame of at least one of said plurality of different Web browsers to thereby provide the browser display frames in the frame hierarchy to the at least one of said plurality of different Web browsers so as to synchronize the view of the source browser and the at least one of said plurality of different Web browsers.

12. The system of claim 11, wherein said means for generating a description comprises:
    means for capturing an entry about said root source frame; and
    means for capturing an entry about each subframe in said frame hierarchy.

13. The system of claim 12, wherein said entry about said source root frame comprises a URL contained in said source root frame and wherein said entry about each subframe comprises:
    a name of each subframe;
    a URL contained in said each subframe; and
    a depth of each subframe in said frame hierarchy.

14. The system of claim 11, wherein said means for duplicating said frame hierarchy using said description comprises:
    means for determining whether a URL currently loaded in said target root frame is identical to a URL loaded into said source root frame; and
    means for initiating a load of said URL of said source root frame into said target root frame if said determination is false.

15. The system of claim 14, further comprising:
    means for retrieving from said description a plurality of entries, each of said plurality of entries providing information about an associated subframe in said frame hierarchy;

means for determining for each of said entries whether said associated subframe has a corresponding subframe of said target root frame;

means for determining whether said URL for said associated subframe is loaded into said corresponding subframe;

means for initiating a load of said URL into said corresponding subframe if said URL is not loaded into said corresponding subframe.

16. The system of claim 11, wherein said means for generating a description is performed by a Collaboration Script executing within a Collaboration Frame in the browser display, and wherein said means for duplicating said frame hierarchy is performed by said Collaboration Script executing within a Collaboration Frame in the browser display.

17. The system of claim 16, wherein said Collaboration Frame is not visible to the user.

18. The system of claim 11, wherein said means for transmitting comprises:

means for transmitting said description from said source browser to a collaboration server;

means for transferring said description from said collaboration server to at least one of said plurality of different web browsers.

19. The system of claim 11, wherein said means for generating a description is initiated by user action.

20. The system of claim 11, wherein said means for using said description is initiated by user action.

21. A computer program product recorded on computer readable medium for synchronizing views among a plurality of different Web browsers in a network environment, comprising:

computer readable means for selecting a source root display frame displayed by a source browser included in said plurality of different web browsers;

computer readable means for generating a description of browser display frames associated with the source root display frame as a frame hierarchy of browser display frames from said selected source root frame;

computer readable means for transmitting said description of a frame hierarchy over the network environment; and computer readable means for duplicating said frame hierarchy from said description into a selected target root display frame of at least one of said plurality of different Web browsers to thereby provide the browser display frames in the frame hierarchy to the at least one of said plurality of different Web browsers so as to synchronize the view of the source browser and the at least one of said plurality of different Web browsers.

22. The program product of claim 21, wherein said computer readable means for generating a description comprises:

computer readable means for capturing an entry about said source root frame; and computer readable means for capturing an entry about each subframe in said frame hierarchy.

23. The program product of claim 22, wherein said entry about said source root frame comprises a URL contained in said source root frame and wherein said entry about each subframe comprises:

a name of each subframe;

a URL contained in said each subframe; and a depth of said each subframe in said frame hierarchy.

24. The program product of claim 21, wherein said computer readable means for duplicating said frame hierarchy using said description comprises:

computer readable means for determining whether a URL currently loaded in said target root frame is identical to a URL loaded into said source root frame; and computer readable means for initiating a load of said URL of said source root frame into said target root frame if said determination is false.

25. The program product of claim 24, further comprising:

computer readable means for retrieving from said description a plurality of entries, each of said plurality of entries providing information about an associated subframe in said frame hierarchy;

computer readable means for determining for each of said entries whether said associated subframe has a corresponding subframe of said target root frame;

computer readable means for determining whether said URL for said associated subframe is loaded into said corresponding subframe; and computer readable means for initiating a load of said URL into said corresponding subframe if said URL is not loaded into said corresponding subframe.

26. The program product of claim 21, wherein said computer readable means for generating a description is performed by a Collaboration Script executing within a Collaboration Frame in the browser display, and wherein said computer readable means for duplicating said frame hierarchy is performed by said Collaboration Script executing within a Collaboration Frame in the browser display.

27. The program product of claim 29, wherein said Collaboration Frame is not visible to the user.

28. The program product of claim 21, wherein said computer readable means for transmitting comprises:

computer readable means for transmitting said description from said source browser to a collaboration server; and computer readable means for transferring said description from said collaboration server to at least one of said plurality of different web browsers.

29. The program product of claim 21, wherein said computer readable means for generating a description is initiated by user action.

30. The program product of claim 21, wherein said computer readable means for using said description is initiated by user action.

* * * * *